(12) United States Patent
Hayashi

(10) Patent No.: US 7,616,337 B2
(45) Date of Patent: Nov. 10, 2009

(54) PRINTING APPARATUS THAT ALLOWS AN INFORMATION DEVICE TO TRANSMIT A PRINT INSTRUCTION TO A PUBLIC PRINTER VIA A SERVER EVEN WHEN THE INFORMATION DEVICE DOES NOT KNOW THE ACCESS ADDRESS OF THE SERVER IN ADVANCE

(75) Inventor: Masao Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 874 days.

(21) Appl. No.: 11/143,824

(22) Filed: Jun. 2, 2005

(65) Prior Publication Data

US 2005/0270569 A1 Dec. 8, 2005

(30) Foreign Application Priority Data

Jun. 8, 2004 (JP) ............................. 2004-170226

(51) Int. Cl.
*G06F 15/00* (2006.01)
(52) U.S. Cl. ........................ 358/1.15; 358/1.6; 358/402; 455/41.3
(58) Field of Classification Search ....... 358/1.11–1.18, 358/402, 1.6; 709/203, 225; 455/41.3
See application file for complete search history.

(56) References Cited

U.S. PATENT DOCUMENTS

| | | | | |
|---|---|---|---|---|
| 2001/0019953 A1* | 9/2001 | Furukawa et al. | ........... | 455/420 |
| 2002/0013869 A1* | 1/2002 | Taniguchi et al. | ............. | 710/33 |
| 2002/0032746 A1* | 3/2002 | Lazaridis | ..................... | 709/217 |
| 2002/0085228 A1* | 7/2002 | Yagita | ........................ | 358/1.15 |
| 2002/0120875 A1* | 8/2002 | Kiwada et al. | .............. | 713/201 |
| 2002/0122201 A1* | 9/2002 | Haraguchi et al. | ......... | 358/1.15 |
| 2002/0138564 A1* | 9/2002 | Treptow et al. | ............. | 709/203 |
| 2003/0007172 A1* | 1/2003 | Takayanagi | ................. | 358/1.15 |
| 2003/0053122 A1* | 3/2003 | Kinoshita | ................... | 358/1.15 |
| 2003/0068045 A1* | 4/2003 | Foth | ........................... | 380/270 |
| 2003/0079134 A1* | 4/2003 | Manchala et al. | ........... | 713/182 |
| 2003/0112464 A1* | 6/2003 | Garcia et al. | ............... | 358/1.15 |
| 2003/0179406 A1* | 9/2003 | Seto | ......................... | 358/1.15 |
| 2003/0189738 A1 | 10/2003 | Kuwata et al. | | |
| 2004/0024743 A1 | 2/2004 | Kato | | |
| 2004/0137919 A1* | 7/2004 | Biundo | ....................... | 455/466 |
| 2004/0218213 A1 | 11/2004 | Shimizu et al. | | |
| 2009/0011708 A1* | 1/2009 | Kim et al. | ................... | 455/41.3 |

FOREIGN PATENT DOCUMENTS

| | | | |
|---|---|---|---|
| JP | 2000-339237 A | 12/2000 |
| JP | 2003-015841 A | 1/2003 |
| JP | 2003-099299 A | 4/2003 |
| JP | 2003-152948 A | 5/2003 |
| JP | 2003-337854 A | 11/2003 |
| JP | 2004-064514 A | 2/2004 |

\* cited by examiner

*Primary Examiner*—Kimberly A Williams
(74) *Attorney, Agent, or Firm*—Canon U.S.A. Inc., I.P. Division

(57) ABSTRACT

A printing apparatus includes a receiving unit for receiving a print request from an information device, a transmitting unit for, upon receiving the print request, transmitting address information of a server and identification information of the printing apparatus to the information device, and a printing unit for carrying out printing based on print data received from the information device via the server.

15 Claims, 19 Drawing Sheets

FIG. 9

E-mail to the following address using the following subject when printing via a cell phone, a PDA, and a mobile PC capable of sending an e-mail:

XY_iRC4000@ABC.co.jp
SUB: PRINT

Server information and instructions on how to print will be returned to you.

FIG. 15

Access the following URL when printing via a cell phone,
a PDA, and a mobile PC capable of connecting the Internet:

http://www.abc.co.jp/printservice/xy/irc4000/RemoteUI.htm

FIG. 18
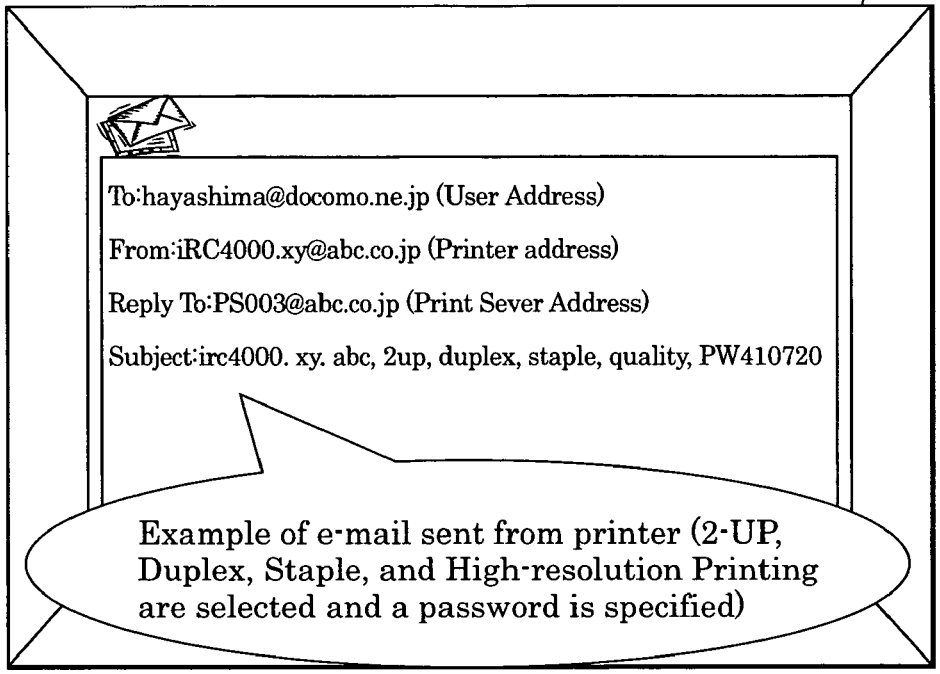
Example of e-mail sent from printer (2-UP, Duplex, Staple, and High-resolution Printing are selected and a password is specified)
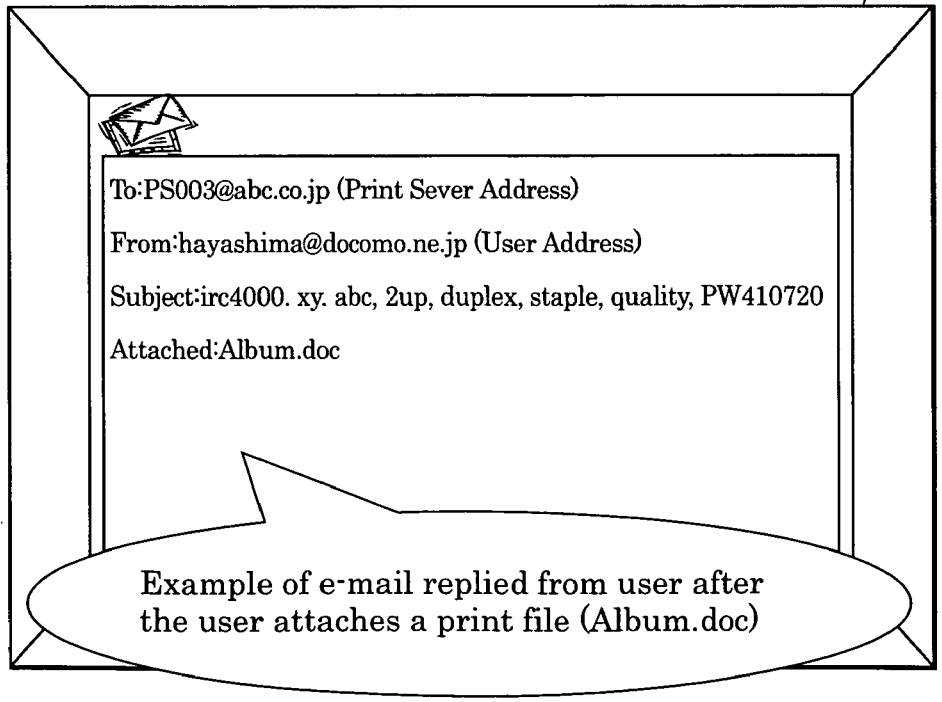
Example of e-mail replied from user after the user attaches a print file (Album.doc)

PRINTING APPARATUS THAT ALLOWS AN INFORMATION DEVICE TO TRANSMIT A PRINT INSTRUCTION TO A PUBLIC PRINTER VIA A SERVER EVEN WHEN THE INFORMATION DEVICE DOES NOT KNOW THE ACCESS ADDRESS OF THE SERVER IN ADVANCE

BACKGROUND OF THE INVENTION

1. Field of the Invention

The present invention relates to a printing scheme in which public users outside offices and homes can print desired document data on printers installed in public places, such as in airports, railway stations, hotels, and convenience stores.

2. Description of the Related Art

Recently, with the widespread use of networked printers, an environment has been proposed in which public users can print desired document data on printers installed in public spaces.

For example, Japanese Patent Laid-Open No. 2000-339237 discloses a printing system that utilizes a cell phone that does not have a print function. An application server receives an e-mail from the cell phone and converts the received e-mail to print data. A printer adapter receives the print data from the application server via a communication network and converts the print data to a format that a printer can receive. The printer prints the print data converted by the printer adapter.

However, to transmit an e-mail to the application server, the cell phone must know the e-mail address of the application server in advance. If the cell phone does not know the e-mail address of the application server, the cell phone cannot utilize the printing system.

SUMMARY OF THE INVENTION

The present invention provides a printing apparatus that allows an information device to more easily transmit a print instruction to a public printer via a server even when the information device does not know the access address of the server in advance.

According to an aspect of the present invention, a printing apparatus includes a receiving unit for receiving a print request from an information device, a transmitting unit for, upon receiving the print request, transmitting address information of a server and identification information of the printing apparatus to the information device, and a printing unit for carrying out printing based on print data received from the information device via the server.

Other features and advantage of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows a display screen example of displaying an e-mail address according to the second embodiment.

FIG. 15 shows a display screen example of a Web service URL display according to the third embodiment.

FIG. 18 shows examples of screens displayed on a mobile information device according to the third embodiment.

DESCRIPTION OF THE EMBODIMENTS

First Embodiment

Figure 1:
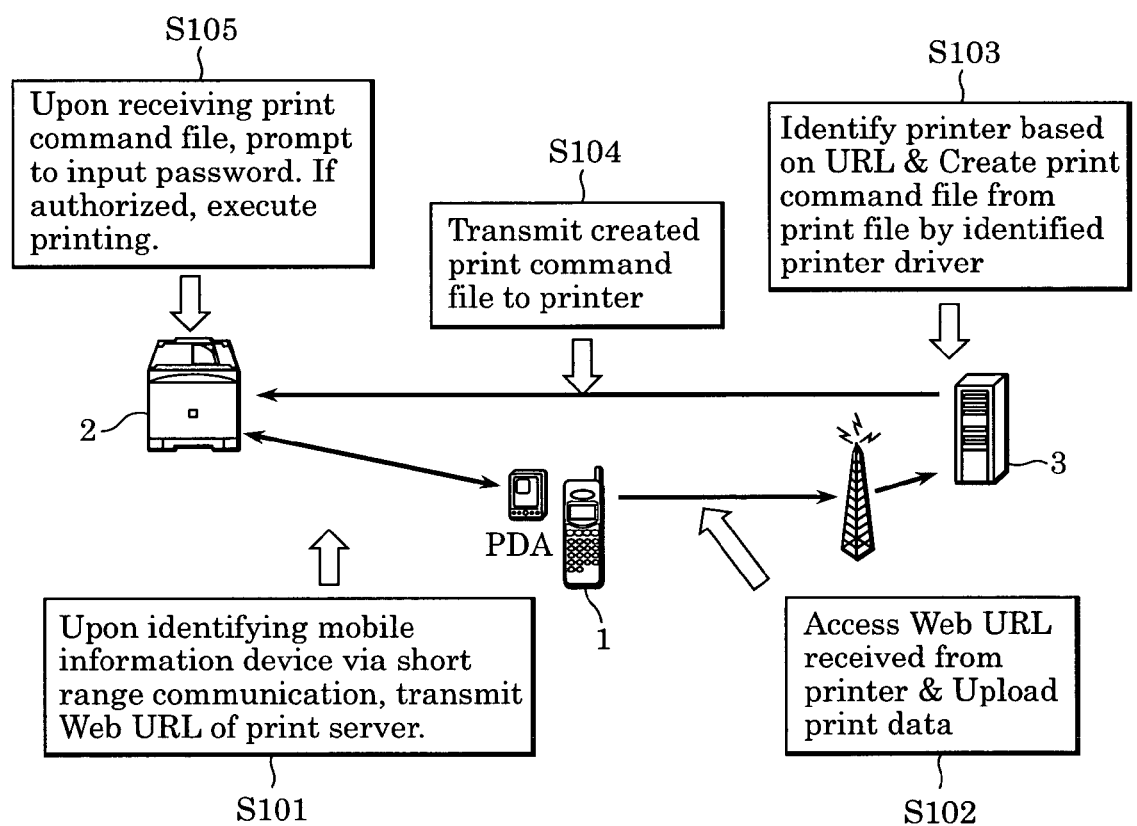
FIG. 1 is a diagram illustrating the function of a system according to a first embodiment of the present invention.

FIG. 1 shows data flows and functions of a mobile-information-device direct public print system according to a first embodiment of the present invention. A mobile information device 1 is, for example, a high-performance cell phone, a personal digital assistant (PDA), or a mobile personal computer (PC). A public printer (printing apparatus) 2 is installed in a public location, such as a convenience store, an airport, a railway station, a hotel, or an event hall. The public printer 2 is connected to the Internet to provide a service to the general public. A print-service server 3 is also connected to the Internet. The print-service server 3 is composed of a PC or a workstation that supports the print service of the public printer 2.

The data flows and functions shown in FIG. 1 are described next. First, at step S101, a user brings the mobile information device 1 close to the public printer 2. Upon recognizing the mobile information device 1 via short range communication, such as IrDA, Bluetooth, and UWB (Ultra Wideband), the public printer 2 transmits a address information, i.e., a Web URL (Uniform Resource Locator) of the print-service server 3 to the mobile information device 1 so that the mobile information device 1 can upload a print file to the print-service server 3.

At step S102, the mobile information device 1 accesses the Web URL received from the public printer 2 (at step S101)

and uploads a print file to the print-service server 3. Simultaneously, the mobile information device 1 sets up a print mode, registers a password, and transmits the print mode setting and the password to the print-service server 3.

At step S103, the print-service server 3 identifies the address of the public printer 2 based on the above-described URL (i.e., identification information of the public printer 2), and creates a print command file based on the uploaded print file using a dedicated printer driver for the public printer 2. If there are a plurality of public printers 2, a different URL is prepared for each of the public printers 2.

At step S104, the print-service server 3 transmits the created print command file and the registered password to the public printer 2.

At step S105, upon receiving the print command file, the public printer 2 instructs a user to input a password. The user of the mobile information device 1 inputs a password to the public printer 2. If the password is successfully authorized, the public printer 2 executes printing based on the print command file.

Figure 2:
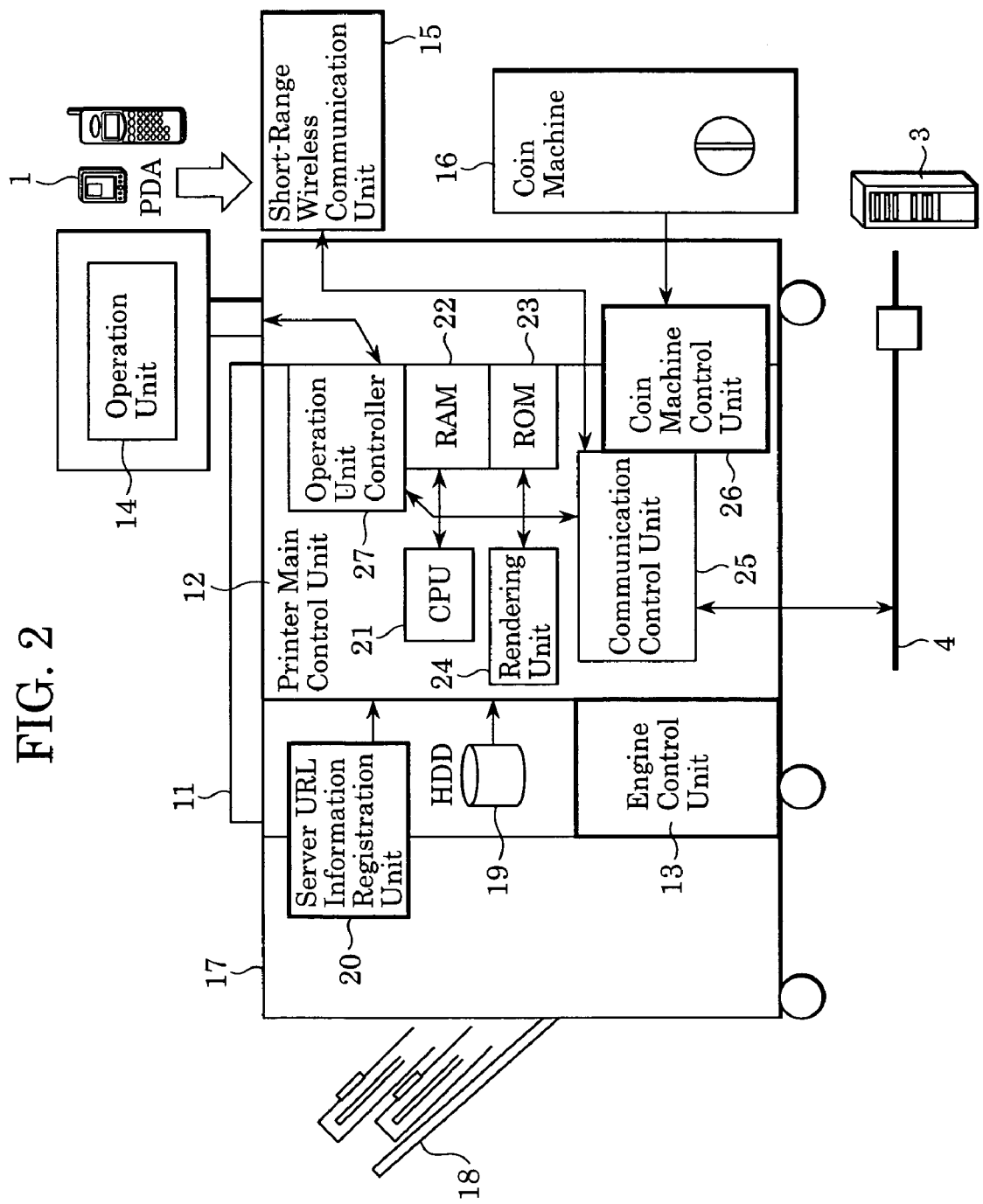
FIG. 2 is a block diagram of a public printer according to the first embodiment.

FIG. 2 shows components of the public printer 2 according to the first embodiment. The public printer 2 includes a printer body 11 and a finisher 17. The printer body 11 carries out printing. The finisher 17 carries out post-printing processes, such as sorting, stapling, punching, and book binding. In this embodiment, only a print function will be described. Therefore, the public printer 2 is referred to as just a "printer". However, in practice, a device installed at a convenience store is typically a multi function peripheral (MFP), which has a copy function, a print function and so on. An operation unit of an MFP having a copy function is described below.

The printer body 11 includes a main control unit 12 for controlling primary functions, such as communication, data input, and rendering; an engine control unit 13 for controlling the execution of printing; an operation unit 14 including a display device, such as an LCD (liquid crystal display), and an input device including a hard key and a touch panel; a short-range wireless communication unit 15 for communicating with the mobile information device 1 using short range wireless communication, such as IrDA, Bluetooth, and UWB; a coin machine 16 for collecting fees for printing; a coin machine control unit 26 for controlling an interface between the coin machine 16 and the main control unit 12; and a hard disk drive (HDD) 19, which is a mass-storage unit for storing a large amount of print data.

The printer main control unit 12 includes a CPU (central processing unit) 21, a RAM (random access memory) 22, and a ROM (read-only memory) 23, a rendering unit 24 for generating print data output to the engine control unit 13, a communication control unit 25 for receiving and transmitting information from and to an external device via a network 4, and an operation unit controller 27 for receiving and transmitting information from and to the operation unit 14. The main control unit 12 further includes a server URL information registration unit 20 for holding a Web URL used for uploading a print file to the print-service server 3 on the Internet. The print-service server 3 creates a print command file from a print file. The Web URL is sent to the mobile information device 1 via the short-range wireless communication unit 15. The finisher 17 includes an output paper bin 18, in which a printout for each user is offset stacked for easier separation.

Figure 3:
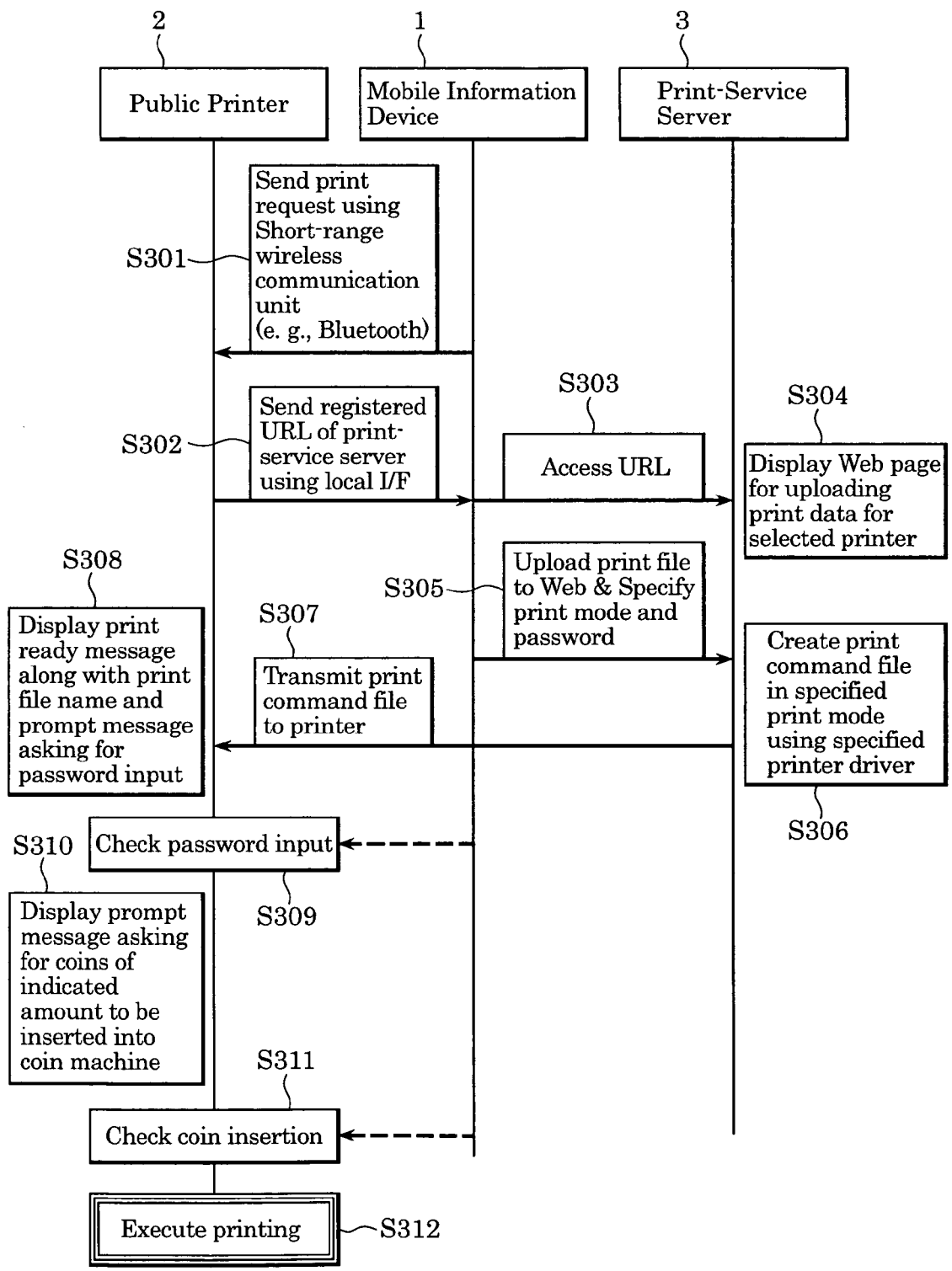
FIG. 3 is a data transition diagram according to the first embodiment.
Figure 4:
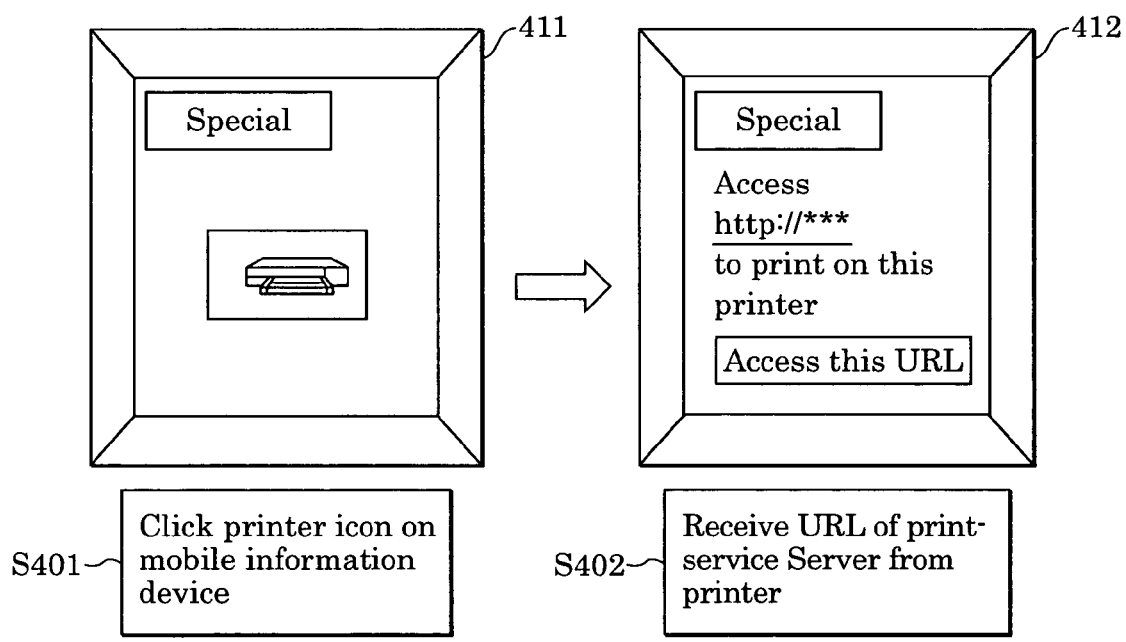
FIG. 4 shows examples of screens displayed on a mobile information device according to the first embodiment.

FIG. 3 illustrates further detail of the method for printing data using the mobile information device 1 according to the first embodiment. FIG. 4 shows examples of screens displayed on the mobile information device 1 according to the first embodiment. First, at step S301 (of FIG. 3), a user brings the mobile information device 1 close to the short-range wireless communication unit 15 of the public printer 2. As shown in FIG. 4, at step S401, the user clicks a printer icon, which is one of the menu items shown on a display screen 411 of the mobile information device 1. The mobile information device 1 communicates with the public printer 2, for example via Bluetooth (a wireless interface). A "printer profile" is pre-installed in the mobile information device 1 to communicate with the public printer 2. The printer profile displays the printer icon, such as the one shown in FIG. 4.

At step S302, when the public printer 2 receives the print request sent by the mobile information device 1, the public printer 2 sends the Web URL of the print-service server 3, which is a print server for supporting the public printer 2 and which receives a print file, to the mobile information device 1. For example, at step S402 in FIG. 4, the URL of the print-service server 3 is displayed on a display screen 412 of the mobile information device 1.

For example, a URL for uploading a print file to print it on a printer (product name: iRC4000) installed at the XY store of the ABC convenience store chain is:

http://www.abc.co.jp/printservice/xy/irc4000_regist.htm

Subsequently, at step S303, the user accesses the URL of the print-service server 3 from the mobile information device 1 by using an Internet connection service for cell phones, for example, i-mode. At step S304, the user opens a Web page for specifying print data to be uploaded. As described above, the accessed URL becomes unique by including a store name and a printer name and has a function to notify the print-service server 3 of the printer type and the location of the printer. Thereafter, at step S305, the user operates the mobile information device 1 to upload a print file to the Web. At the same time, the user specifies a print mode and a password.

Figure 5:
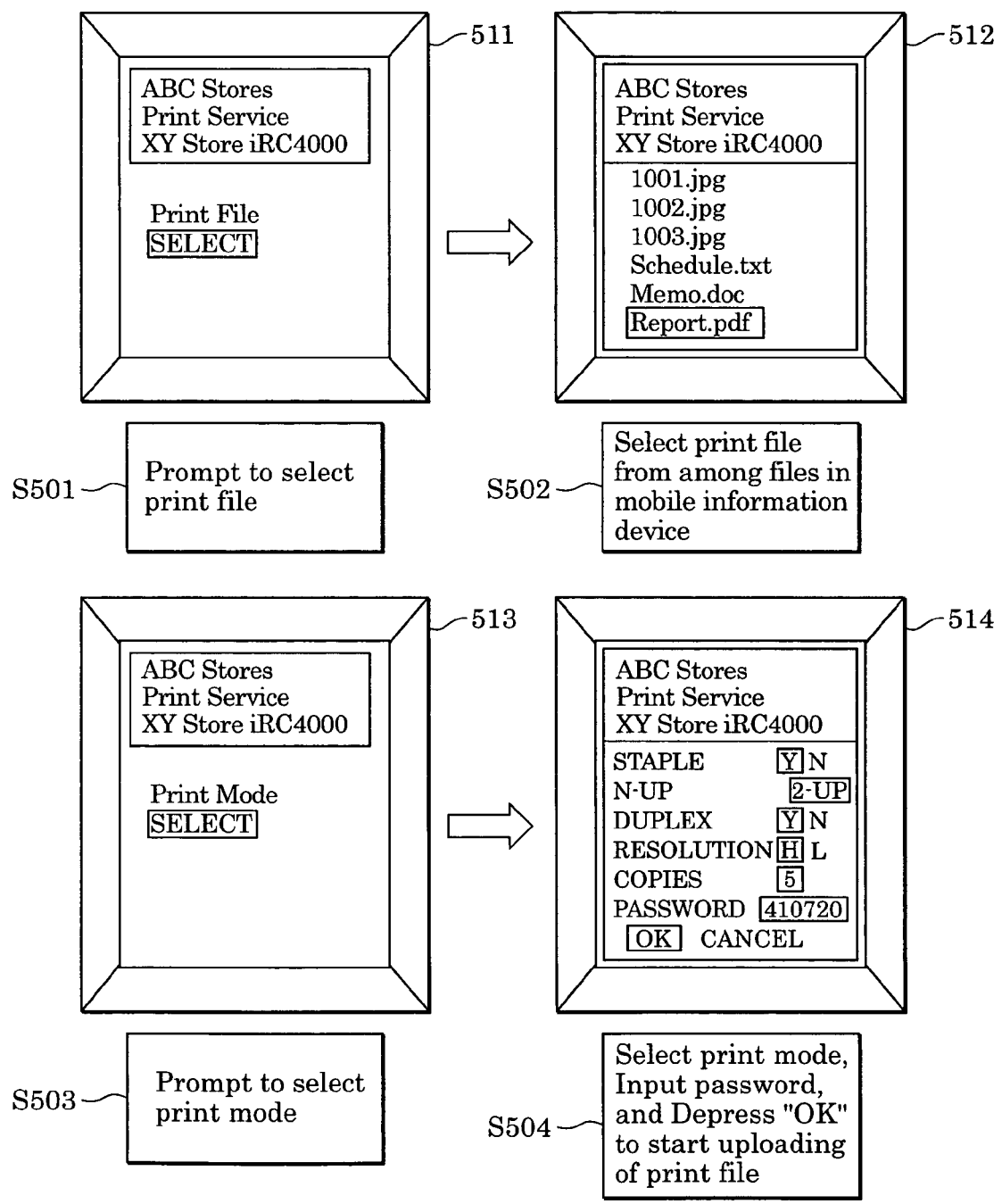
FIG. 5 shows examples of screens displayed on a mobile information device according to the first embodiment.

The displays and operations of the mobile information device 1 are described next with reference to FIG. 5 when the mobile information device 1 uploads the print file to the print-service server 3. First, at step S501, the user is prompted on a display screen 511 of the mobile information device 1 to select a print file. At step S502, the user selects a print file from among print files on a display screen 512 of the mobile information device 1. At step S503, the user is prompted on a display screen 513 of the mobile information device 1 to select a print mode. At step S504, the user selects a print mode, such as finishing and resolution, and inputs a password, which is required to be input at a print execution time in order to prevent a third party from taking the printout. When the user depresses an "OK" button, the print file is uploaded from the mobile information device 1 to the print-service server 3. Upon completion of the above-described inputs, the communication between the mobile information device 1 and the print-service server 3 may be disconnected.

At step S306 in FIG. 3, the print-service server 3 runs a print driver identified by the Web URL to create a print command file printable by the public printer 2 based on the print mode and password set via the Web page and the print file uploaded by the user.

At step S307, the print-service server 3 transfers the print command file to the public printer 2 whose address is also identified by the Web URL. The public printer 2 stores the print command file in the HDD 19 shown in FIG. 2 and waits for a user operation for print execution.

At step S308, the public printer 2 displays a print ready message along with the print file name and a prompt message asking for a password. At step S309, the public printer 2 determines whether the user inputs a password. At step S310, the public printer 2 displays a prompt message asking for coins of an indicated amount to be inserted into the coin machine 16. At step S311, the public printer 2 determines whether the user inserts the coins of the indicated amount. When the proper amount of coins have been inserted, the public printer 2 starts print processing (step S312).

Figure 6:
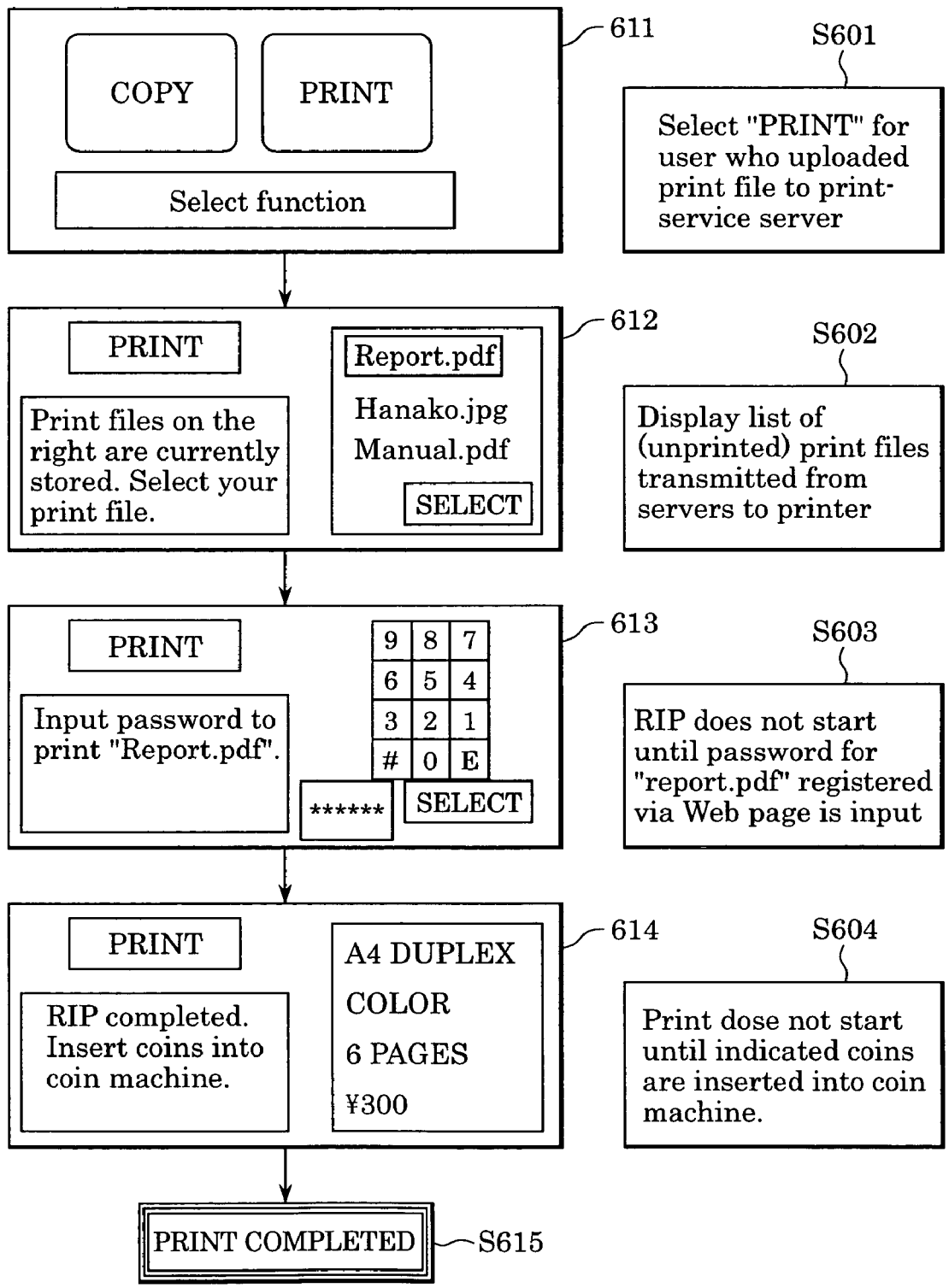
FIG. 6 shows examples of screens displayed on an operation unit of a printer according to the first embodiment when executing a print process.

An example of display screens and operations on the operation unit 14 of the public printer 2 for a user to acquire a printout is described next with reference to FIG. 6. This example corresponds to steps S308 to S312 shown in FIG. 3. First, at step S601, upon completion of uploading the print file to the print-service server 3, the user gets close to the public printer 2 to view a display screen 611 of the public printer 2 and operates the operation unit 14 to switch to a print mode.

At step S602, as shown by a display screen 612, the public printer 2 then displays, on the operation unit 14, a list of file names of transferred print command files, which are held in the HDD 19 of the public printer 2. The user selects his or her own file name.

At step S603, as shown by a display screen 613, the public printer 2 displays a prompt message asking for the password specified at file upload time.

At step S604, if the password is authorized successfully, the public printer 2 executes a RIP process, that is, a process to create print pixel unit information from print commands. The public printer 2 then calculates a fee based on the number of print pages and displays the amount of the fee on the operation unit 14, as shown by a display screen 614. When the user inserts coins for the displayed fee into the coin machine 16 shown in FIG. 2, the public printer 2 executes printing. As a result, the user can acquire a desired printout. The public printer 2 then displays the completion of printing, as shown by a display screen 615.

As described above, although a user does not know the access address of the server in advance, the user can receive the address information of the server by sending a print request via short range wireless communication using a mobile information device 1. Accordingly, the user can send a print instruction to a public printer 2 from the mobile information device 1 via the server 3.

That is, short range wireless data communication for communicating between the mobile information device 1 and the public printer 2 is provided. The public printer 2 provides a URL of the print-service server 3, which creates a print command file for the public printer 2, to the mobile information device 1. Then, the mobile information device 1 uploads a print file to the URL to execute printing. Accordingly, a dedicated driver for the public printer 2 can be used. As a result, high quality image printing and sophisticated printing using a full finisher function of the public printer 2 can be provided. Furthermore, since each public printer 2 independently notifies the mobile information device 1 of the location of the print-service server 3, a public printer located in the USA can use an English-version driver in a server located in the USA and a public printer located in France can use a French-version driver in a server located in France, etc. Thus, a global print service can be provided.

Second Embodiment

Figure 7:
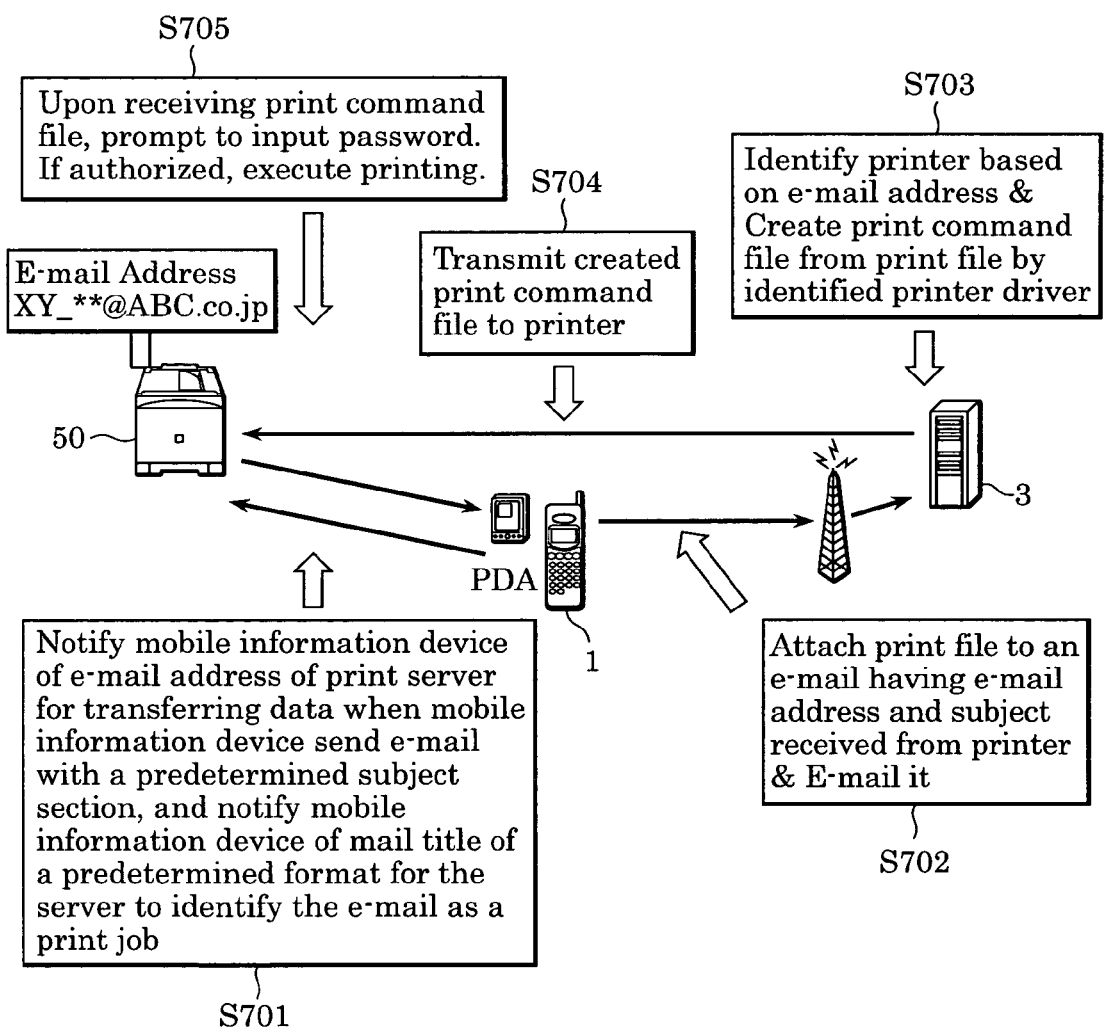
FIG. 7 is a diagram illustrating the function of a system according to a second embodiment of the present invention.

FIG. 7 shows data flows and functions of a mobile-information-apparatus direct public print system according to a second embodiment of the present invention. A mobile information device 1 is, for example, a high-performance cell phone, a PDA, or a mobile PC. A public printer 50 is installed in a public place, such as a convenience store, an airport, a railway station, a hotel, or an event hall. The public printer 50 is connected to the Internet to provide a service to the general public. A print-service server 3 is also connected to the Internet. The print-service server 3 is composed of a PC or a workstation that supports a print service of the public printer 50.

The data flows and functions are described next. First, at step S701, the mobile information device 1 sends an e-mail to the public printer 50 using a predetermined subject format for indicating a print request. The public printer 50 displays its own e-mail address. The user inputs the e-mail address to the mobile information device 1 to send the e-mail to the public printer 50. Upon receiving the e-mail, the public printer 50 returns, to the mobile information device 1, an e-mail address used for uploading a print file to the print-service server 3 and format information on a title to be written in the subject area of the e-mail.

At step S702, the mobile information device 1 transmits a print file, which is a file attached to an e-mail, to the print-service server 3 using the e-mail address and the title format information. When sending the e-mail, a password string is appended to the title.

At step S703, the print-service server 3 identifies the address of the public printer 50 based on the received e-mail title information (i.e., identification information of the public printer 50), and then creates a print command file from the print file sent from the mobile information device 1 using the dedicated printer driver for the public printer 50.

At step S704, the print-service server 3 transmits the created print command file and the password, which the user appended to the title of the e-mail, to the public printer 50.

At step S705, upon receiving the print command file, the public printer 50 instructs a user to input a password. The user of the mobile information device 1 inputs a password to the public printer 50. If the password is successfully authorized, the public printer 50 executes printing.

Figure 8:
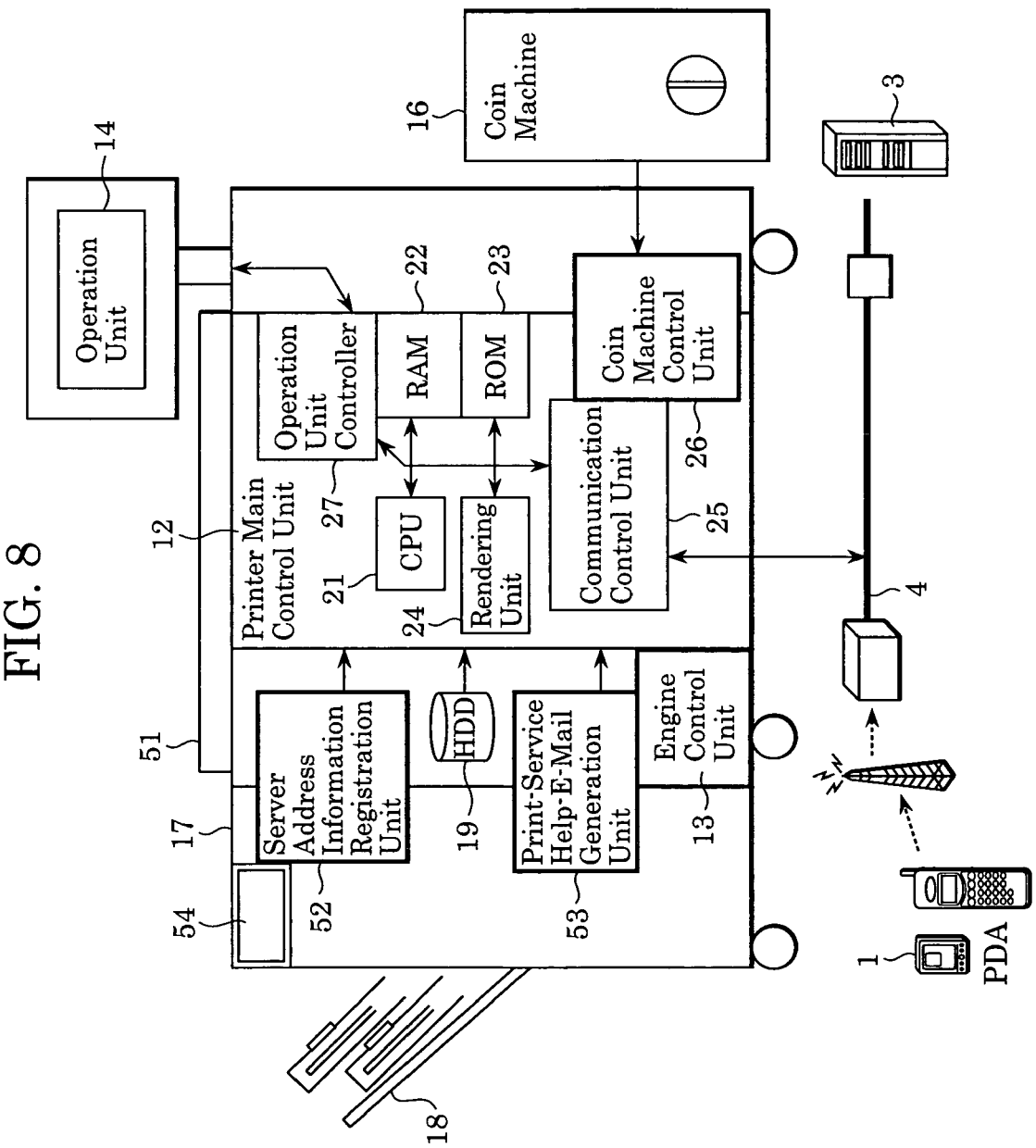
FIG. 8 is a block diagram of a public printer according to the second embodiment.

FIG. 8 shows components of the public printer 50 according to the second embodiment. The identical components to those described in relation to the first embodiment are designated by identical reference numerals, and the descriptions thereof are not repeated here. The public printer 50 includes a printer body 51 and a finisher 17. The printer body 51 includes a main control unit 12, an engine control unit 13, an operation unit 14, the coin machine 16, a coin machine control unit 26, and an HDD 19.

A server address information registration unit 52 stores e-mail address information used for transferring a print file to the print-service server 3 on the Internet when providing a print service. The print-service server 3 creates a print command file from the print file. Upon receiving an e-mail having a title of a predetermined format from the mobile information device 1, a print service help e-mail generation unit 53 returns a "print service help e-mail" to the mobile information device 1. The "print service help e-mail" includes a description as to how to upload a print file to the print-service server 3. An e-mail address display 54 displays a message indicating that a user should send an e-mail to the displayed address to print a file on the public printer 50.

FIG. 9 shows a display screen example of the e-mail address display 54. The e-mail address display 54 displays the e-mail address of the public printer 50 and a predetermined title (i.e., a subject). When the user sends an e-mail to the displayed e-mail address of the public printer 50 using the title "Subject: PRINT", the public printer 50 returns a help e-mail to the user's mobile information device 1 from the print service help e-mail generation unit 53.

A method for printing data in a mobile information device according to the second embodiment is described next in detail with reference to FIG. 10.

At step S1001, in order to carry out printing, a user having a mobile information device 1 gets close to the public printer 50 to view the message displayed on the e-mail address display 54, such as the one shown in FIG. 9. The user's mobile information device 1 then sends an e-mail whose subject is "SUB: PRINT" to the displayed address of the public printer 50.

Subsequently, at step S1002, upon receiving the e-mail having "SUB: PRINT" in the subject section, the public printer 50 recognizes that the user requests a print service. The public printer 50 then returns a print service help e-mail, which describes how to upload a print file to the print-service server 3, to the mobile information device 1.

A specific example is described next with reference to FIG. 11. At step S1101, the mobile information device 1 receives the e-mail from the public printer 50 so as to display it, as shown in a display screen 1111. At step S1102, the mobile information device 1 then displays the e-mail from the public printer 50. The e-mail includes an e-mail address of the print-service server 3 and a predetermined mail title format, as shown in a display screen 1112. The e-mail includes a message indicating that the user must input a password to be used at a print execution time as a part of the title. This print service help e-mail includes at least:

(1) The e-mail address of the print-service server 3;
(2) Subject (title) format for identifying the public printer 50;
(3) A reminder message to attach a print file; and
(4) Information on appending a password string having a predetermined length to the subject.

Based on this information, the user creates, on the mobile information device 1, a "Print file sending e-mail" used for sending a print file to the print-service server 3.

Figure 10:
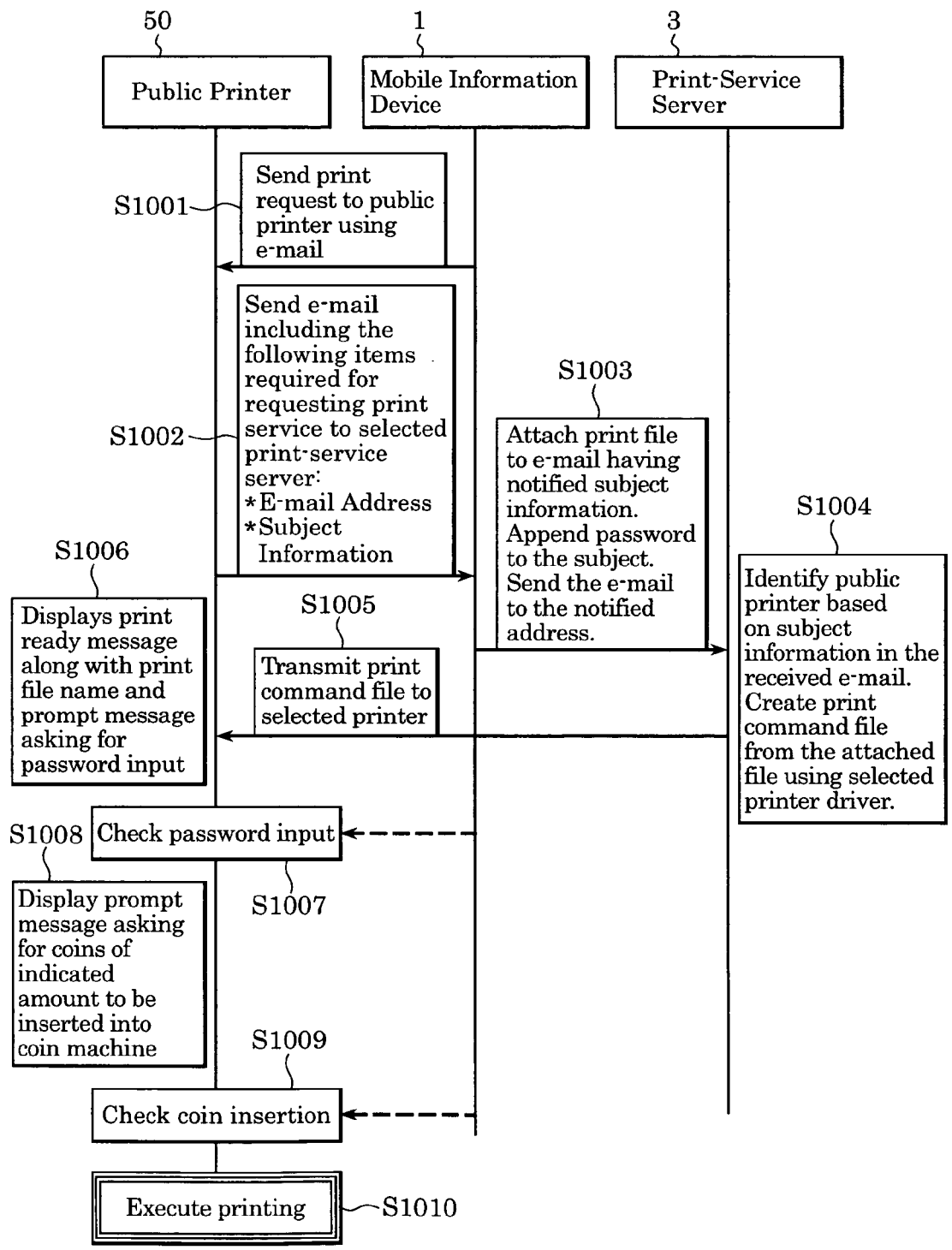
FIG. 10 is a data transition diagram according to the second embodiment.

At step S1003 in FIG. 10, the mobile information device 1 attaches a print file to the e-mail having the notified subject and sends the e-mail to the notified address of the print-service server 3. At that time, a password string is appended to the subject.

Figure 11:
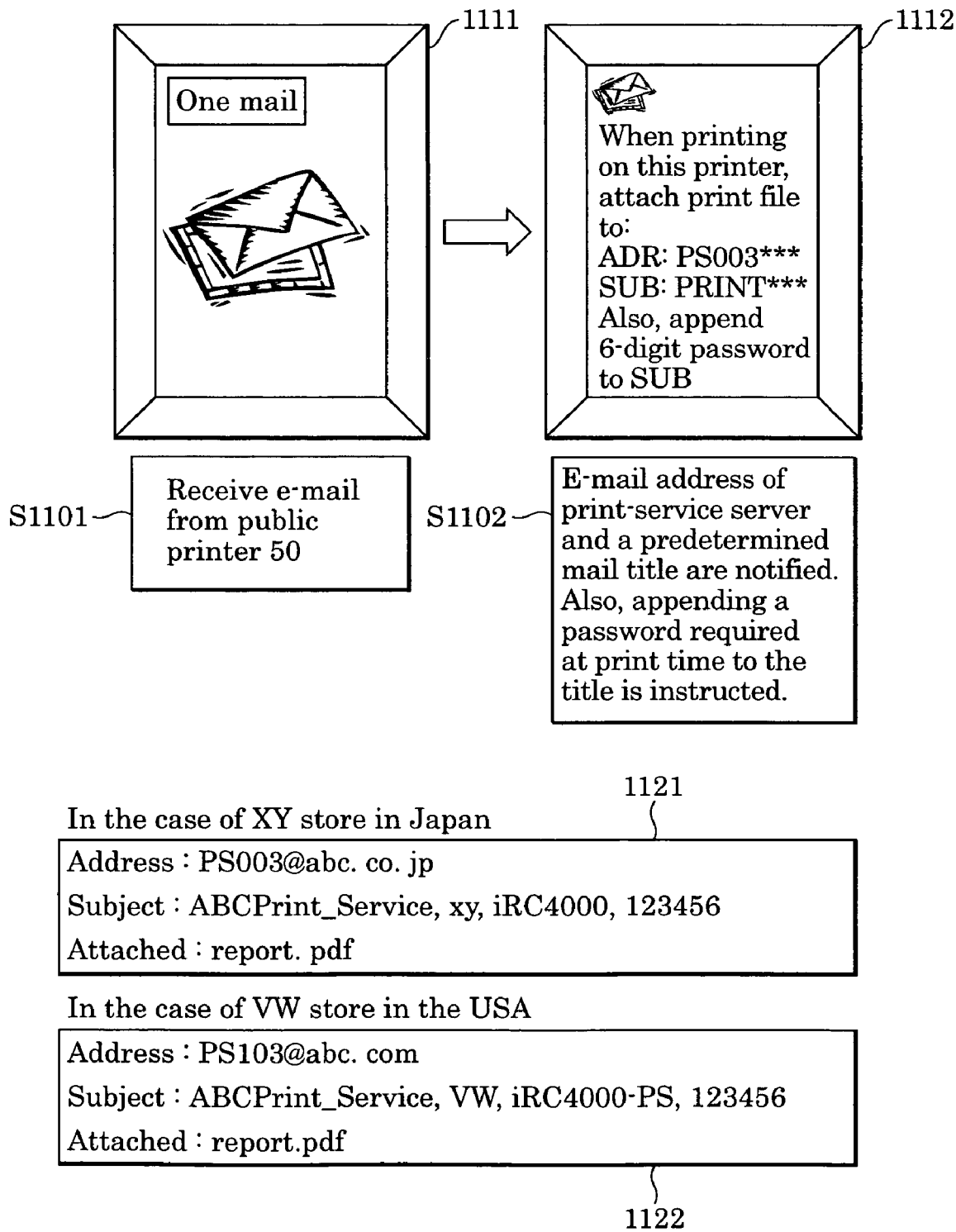
FIG. 11 shows examples of screens displayed on a mobile information device according to the second embodiment.

For example, as shown by an e-mail 1121 in FIG. 11, in order to print the print file "report.pdf" on a printer whose product name is, for example, iRC4000 located at the XY store in Japan of the ABC convenience store chain, the e-mail for sending the print file includes the following text:
 Address: PS003@abc.co.jp
 Subject: ABCPrint_Service,xy,iRC4000,123456
 Attached: report.pdf Also, as shown by an e-mail 1122 in FIG. 11, in order to print the print file "report.pdf" by a printer whose product name is, for example, iRC4000-PS located at the VW store in the USA of the ABC convenience store chain, the e-mail for sending the print file includes the following text:
 Address: PS103@abc.com
 Subject: ABCPrint_Service,VW,iRC4000-PS,123456
 Attached: report.pdf At step S1004 in FIG. 10, upon receiving the e-mail for sending a print file and the attached print file from the mobile information device 1, the print-service server 3 runs a print driver identified by the subject information in the e-mail to create a print command file printable by the public printer 50 based on the password appended to the subject information and the print file attached by the user.

At step S1005, the print-service server 3 then transfers the print command file to the address of the public printer 50 identified by the subject information.

At step S1006, the public printer 50 receives the print command file, stores the print command file in the HDD 19, and waits for a user operation for print execution. The public printer 50 displays a print ready message along with the print file name and a prompt message asking for a password.

At step S1007, the public printer 50 receives a password from the user of the mobile information device 1 and determines whether the password is authorized. At step S1008, the public printer 50 then displays a prompt message asking for coins of an indicated amount to be inserted into the coin machine 16. At step S1009, the public printer 50 determines whether the user of the mobile information device 1 inserts the coins of the indicated amount. Then, the public printer 50 starts print processing.

Figure 12:
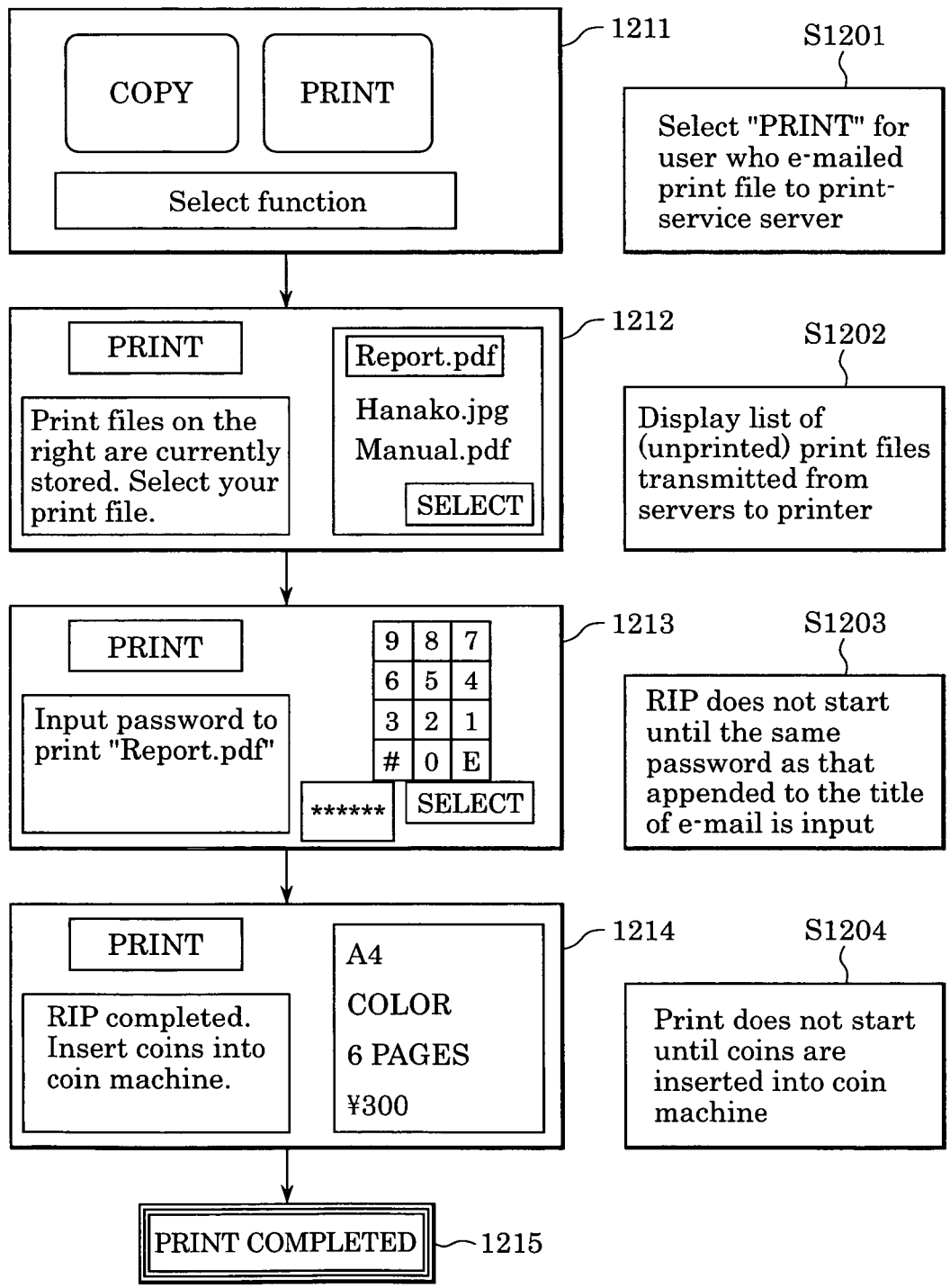
FIG. 12 shows examples of screens displayed on an operation unit of a printer according to the second embodiment when executing a print process.

An example of display screens and operations on the operation unit 14 of the public printer 50 for a user to acquire a printout are described next with reference to FIG. 12. This example corresponds to steps S1006 to S1010 shown in FIG. 10.

At step S1201, the public printer 50 displays a display screen 1211. Upon completion of sending the print file attached to the e-mail to the print-service server 3, the user gets close to the public printer 50 to operate the operation unit 14 to switch to a print mode.

At step S1202, as shown by a display screen 1212, the public printer 50 then displays, on the operation unit 14, a list of file names of transferred print command files, which are held in the HDD 19 of the public printer 50. The user selects his or her own file name.

At step S1203, when the user selects his or her own file name, the public printer 50 displays a display screen 1213 that prompts the user to input the same password as that appended to the subject on the operation unit 14.

At step S1204, if the password is authorized successfully, the public printer 50 executes a RIP process. The public printer 50 then calculates a fee based on the number of print pages and displays a display screen 1214 on the operation unit 14. When the user inserts coins for the displayed fee into the coin machine 16 shown in FIG. 8, the public printer 50 executes printing. As a result, the user can acquire a desired printout. The public printer 50 then displays the completion of printing, as shown by a display screen 1215.

As described above, although a user does not know the access address of the server in advance, the user can receive the address information of the server by sending a print request via an e-mail using a mobile information device 1. Accordingly, the user can send a print instruction to a public printer from the mobile information device via the server.

That is, a public printer 50 has a function that returns an e-mail for notifying a mobile information device of the address of a print-service server when the public printer receives an e-mail having a predetermined subject from the mobile information device. The print-service server 3 has a function such that, based on the subject information of the e-mail from a user of the mobile information device 1, print-service server identifies the address and the type of the public printer 2 used for printing a print file attached to the e-mail. Accordingly, a dedicated driver for the public printer can be used. As a result, high quality image printing can be provided, and a global print service that can expand worldwide can be provided. Furthermore, unlike the first embodiment, even though the mobile information device has no short range communication and no Web access function, this embodiment can be achieved. That is, this embodiment has an advantage in that the print service is unaffected by the function of the mobile information device 1 and in that, once a user utilizes the service, the user can send a print file from remote locations without getting close to the public printer.

Third Embodiment

Figure 13:
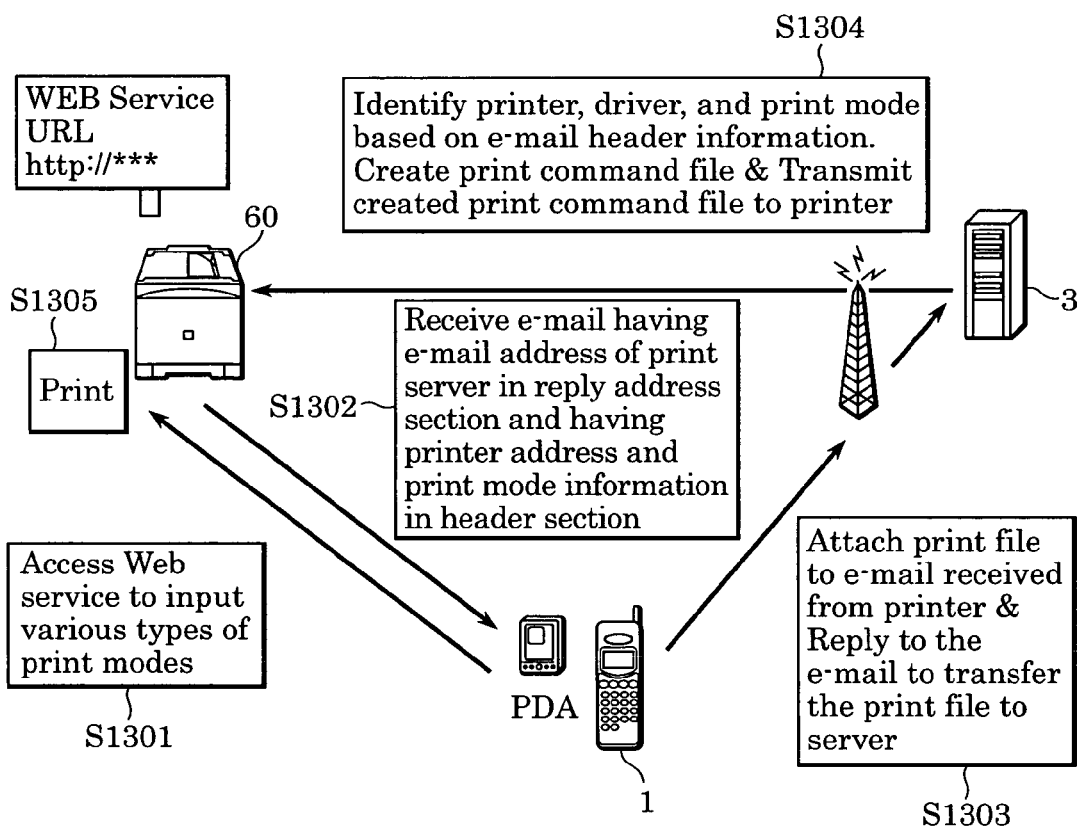
FIG. 13 is a diagram illustrating the function of a system according to a third embodiment of the present invention.

FIG. 13 shows data flows and functions of a mobile-information-apparatus direct public print system according to a third embodiment of the present invention. A mobile information device 1 is, for example, a high-performance cell phone, a PDA, or a mobile PC. A public printer 60 is installed in a public place, for example, a convenience store, an airport, a railway station, a hotel, or an event hall. The public printer 60 is connected to the Internet to provide a service to the general public. A print-service server 3 is also connected to the Internet. The print-service server 3 is composed of a PC or a workstation that supports a print service of the public printer 60. The public printer 60 includes a Web server, which accepts access to a Web home page from the mobile information device 1 and provides Web services, such as a print service, a status display service, and a job log display service.

The data flows and functions shown in FIG. 13 are described next. First, at step S1301, the mobile information device 1 accesses the Web service provided by the public printer 60 and sets the desired print mode and password so as to request printing. At step S1302, the public printer 60 then sends an e-mail whose reply address section has an e-mail address of the print-service server 3 to the mobile information device 1. The subject (header) section of the e-mail contains specified print mode information and a printer address. At step S1303, a user of the mobile information device 1 attaches a desired print file to the e-mail and replies to the e-mail. The e-mail is sent from the mobile information device 1 to the print-service server 3. At step S1304, the print-service server 3 identifies the address of the public printer 60 and the printer driver based on the subject information in the received e-mail and reads out the print mode and password specified by the user. The print-service server 3 then creates a print command file from the attached print file and transfers it to the public printer 60. At step S1305, upon receiving the print command file, the public printer 60 prompts the user to input a password. If the password is successfully authorized, the public printer 60 executes printing.

The components of the public printer 60 according to the third embodiment are described next with reference to FIG. 14. The identical components to those described in relation to the above-described embodiments are designated by identical reference numerals, and the descriptions thereof are not repeated here. The public printer 60 includes a printer body 61 and a finisher 17. The printer body 61 includes a main control unit 12, an engine control unit 13, an operation unit 14, a coin machine 16, a coin machine control unit 26, and an HDD 19.

A server address information registration unit 62 stores e-mail address information used for transferring a print file to the print-service server 3 on the Internet when providing a print service. The print-service server 3 creates a print command file from the print file. When the mobile information device 1 accesses the public printer 60 using a predetermined URL, a Java Web service control unit 63 displays a built-in Web page including a status of the public printer 60 on the mobile information device 1 to allow a user to input a variety of data via the mobile information device 1. A print service e-mail creation unit 64 creates an e-mail used for transmitting, to the print-service server 3, a variety of print mode information for a print service input from the mobile information device 1 via the Web service. Web service URL display 65 displays a message indicating that a user should access a Web page in the public printer 60 in order to print a print file on the public printer 60.

FIG. 15 shows a display example on the Web service URL display 65. For example, a URL for accessing a Web page on a printer (product name: iRC4000) installed at the XY store of the ABC convenience store chain is displayed as follows:
    http://www.abc.co.jp/printservice/xy/irc4000/RemoteUI.htm The user accesses this URL to set up a variety of print modes.

Figure 16:
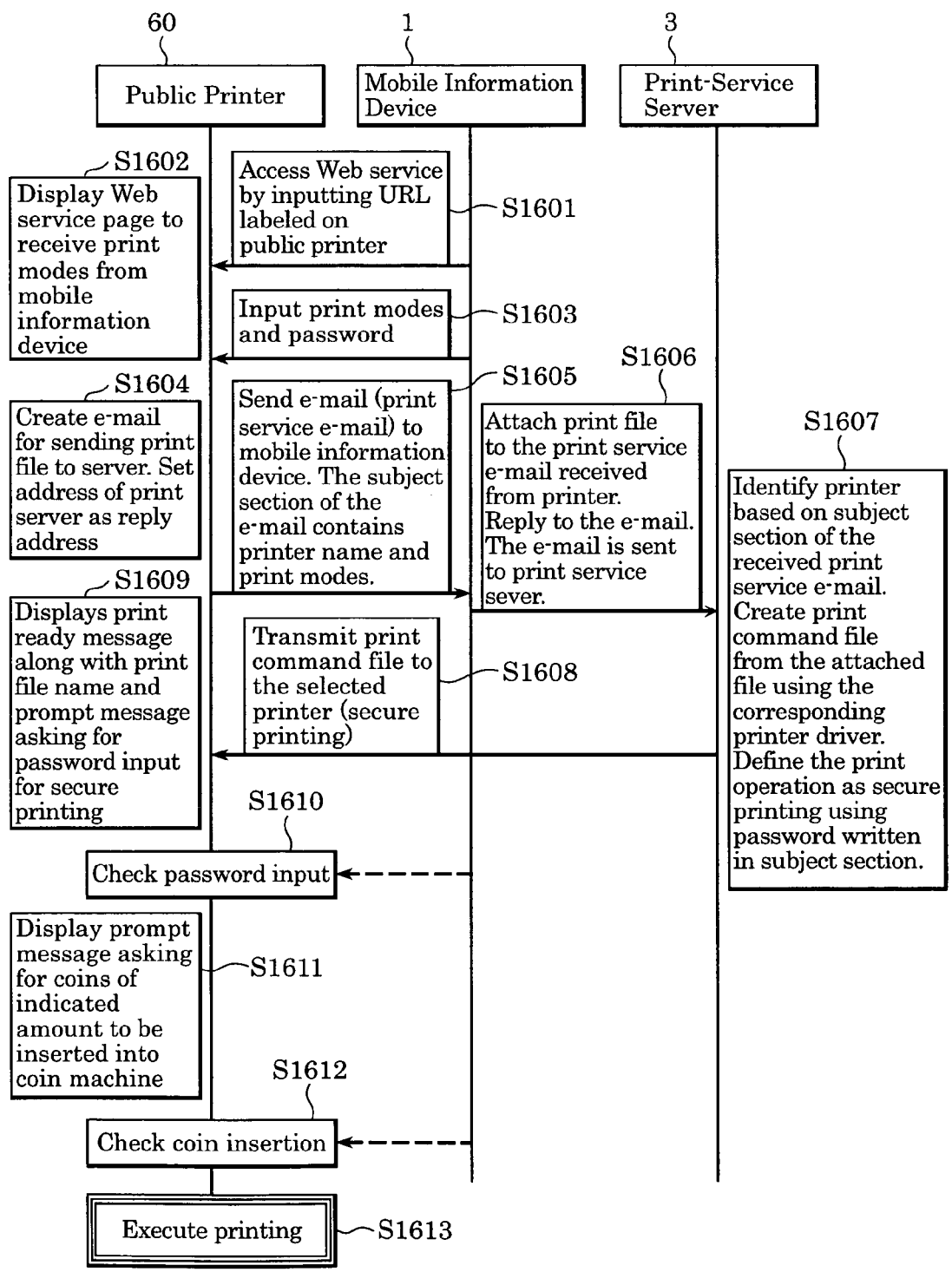
FIG. 16 is a data transition diagram according to the third embodiment.

A method for printing a desired file in the mobile information device according to the third embodiment is described next in more detail with reference to FIG. 16.

At step S1601, in order to carry out printing, a user with a mobile information device 1 gets close to the public printer 50 to view the display of the Web service URL display 65 on the public printer 60, such as the one shown in FIG. 15. The user then accesses the displayed URL via the mobile information device 1.

At step S1602, the public printer 60 displays a Web page to receive a print mode to be used at print time from the mobile information device 1.

At step S1603, the user inputs a print mode and a password from the mobile information device 1 via the Web page.

At step S1604, the public printer 60 creates a print service e-mail which is used for transmitting a print file to the print-service server 3 and which has the address of the print-service server 3 as a reply address.

At step S1605, the public printer 60 sets parameters of the print mode for the public printer 60 to those indicated in the subject section of the print service e-mail and transmits the print service e-mail to the mobile information device 1.

At step S1606, the mobile information device 1 attaches a print file to the print service e-mail received from the public printer 60 and replies to it. Thus, the print service e-mail is sent to the print-service server 3.

Figure 17:
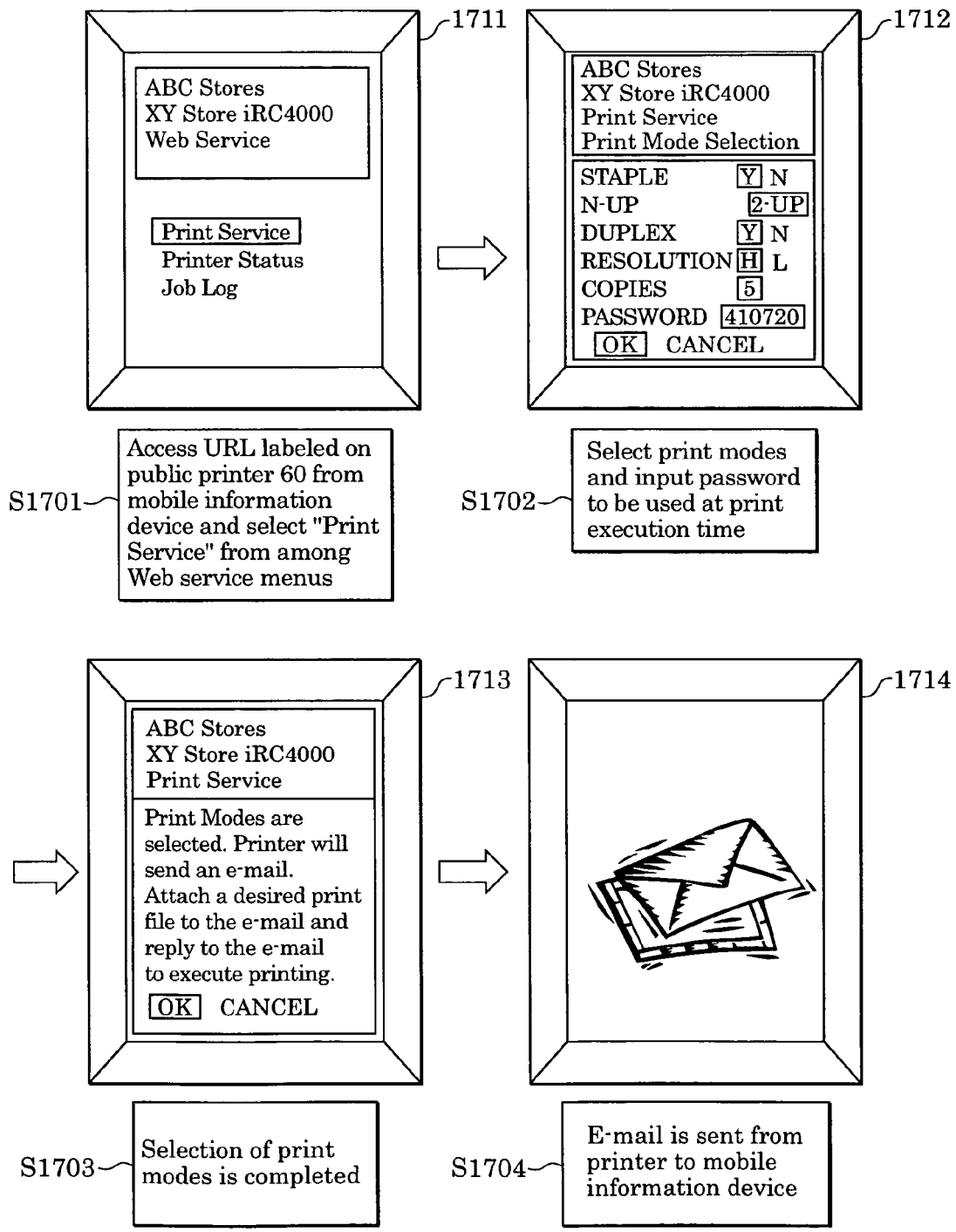
FIG. 17 shows examples of screens displayed on a mobile information device according to the third embodiment.

FIG. 17 shows an example of displays and operations on the mobile information device 1. This example corresponds to steps S1601 to S1605 shown in FIG. 16. At step S1701, as shown by a display screen 1711, a Web page of the public printer 60 is displayed on a display of the mobile information device 1. Menus, such as "Print Service", "Printer Status", and "Job Log", are displayed. A user who requests printing selects the menu "Print Service".

At step S1702, as shown by a display screen 1712, the menu page is changed to a "Print Mode Selection" page. The user can specify a print mode, such as "Staple", "N-UP", "Duplex Printing", "Resolution", and "Print copies". The user finally inputs a password to be used at print execution time.

Upon completion of setting the print mode, a guidance message for a public printer is displayed at step S1703, as shown by a display screen 1713. In this example, the message "Attach a desired print file to the e-mail and reply to the e-mail" is displayed. When the user depresses an "OK" key, the user, at step S1704, receives an e-mail from the public printer 60, so that a display screen 1714 is displayed.

Details of the e-mail received from the public printer 60 are described next with reference to FIG. 18. As shown in a display screen 1811 of the mobile information device 1, the following items of the e-mail received from the public printer 60 are shown:

"To:" indicates the address of the mobile information device 1.
    "From:" indicates the address of the public printer 60.
    "Reply To:" indicates the address of the print-service server 3 specified by the public printer 60.

"Subject:" indicates print condition information in which an ID of the public printer 60 and a variety of print modes and a password specified by the user are written, to comply with a predetermined format. As print conditions, for example, 2-up printing, duplex printing, staple finishing, and high-resolution printing are selected and a password is specified.

The user replies to the received e-mail on the mobile information device 1 to specify a file to be printed as an attached file. As shown in a display screen 1812 of the mobile information device 1, the reply mail includes the following items: (Using the mobile information device 1, the user attaches the print file "Album.doc" to the reply mail and returns it to the print-service server 3 (step S1606)):

"To:" indicates the address of the print-service server 3.

"From:" indicates the address of the mobile information device 1.

"Subject:" indicates print condition information in which the ID of the public printer 60 and a variety of print modes and the password are written, to comply with a predetermined format.

"Attached:" indicates the attached file to be printed.

Referring back to FIG. 16, at step S1607, upon receiving the e-mail for sending a print file and the attached print file from the mobile information device 1, the print-service server 3 runs a print driver identified by the public printer ID in the subject information in the e-mail to create a print command file printable by the public printer 60 based on the print mode and the password written in the subject and the attached print file. At step S1608, the print-service server 3 then transfers the print command file to the address of the public printer 60 written in the subject information. At that time, secure printing is carried out using the password written in the subject. The public printer 60 stores the print command file in the HDD 19 shown in FIG. 14, and waits for a user operation for print execution.

At step S1609, the public printer 60 displays the print file name along with a print ready message and a prompt message for inputting a password. At step S1610, the public printer 60 receives the password input by the user of the mobile information device 1 and determines whether the password is authorized. At step S1611, the public printer 60 displays a prompt message asking for coins of an indicated amount to be inserted into the coin machine 16. At step S1612, the public printer 60 determines whether the user inserted the coins of the indicated amount. Then, at step S1613, the public printer 60 starts print processing.

Figure 19:
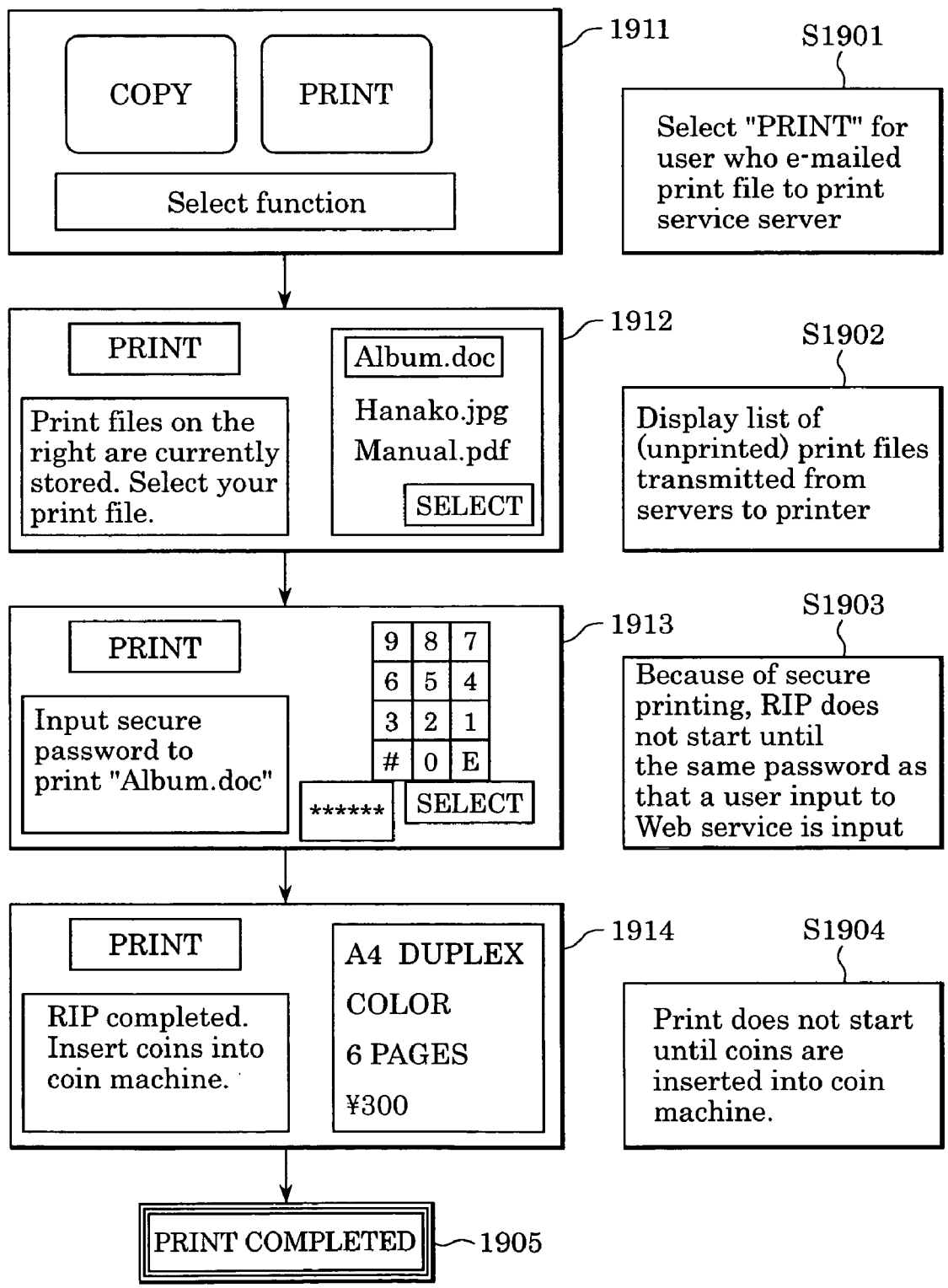
FIG. 19 shows examples of screens displayed on an operation unit of a printer according to the third embodiment when executing a print process.

An example of display screens and operations on the operation unit 14 of the public printer 60 for a user to acquire a printout are described next with reference to FIG. 19. This example corresponds to steps S1609 to S1613 in FIG. 16.

At step S1901, the public printer 60 displays a display screen 1911. Upon completion of sending the print file attached to the e-mail to the print-service server 3, the user gets close to the public printer 60 to operate the operation unit 14 to switch to a print mode.

At step S1902, as shown by a display screen 1912, the public printer 60 then displays, on the operation unit 14, a list of file names of transferred print command files, which are held in the HDD 19 of the public printer 60.

At step S1903, when the user selects his or her own file name, the public printer 60 displays a display screen 1913 that prompts the user to input the same password as that appended to the subject on the operation unit 14. Since this is secure printing, the RIP does not start until a user inputs the same password as that input on the Web page by the user.

At step S1904, if the password is successfully authorized, the public printer 60 executes a RIP process. The public printer 60 then calculates a fee based on the number of print pages and displays a display screen 1914 on the operation unit 14. Printing does not start until the user inserts coins for the displayed fee into the coin machine 16.

Figure 14:
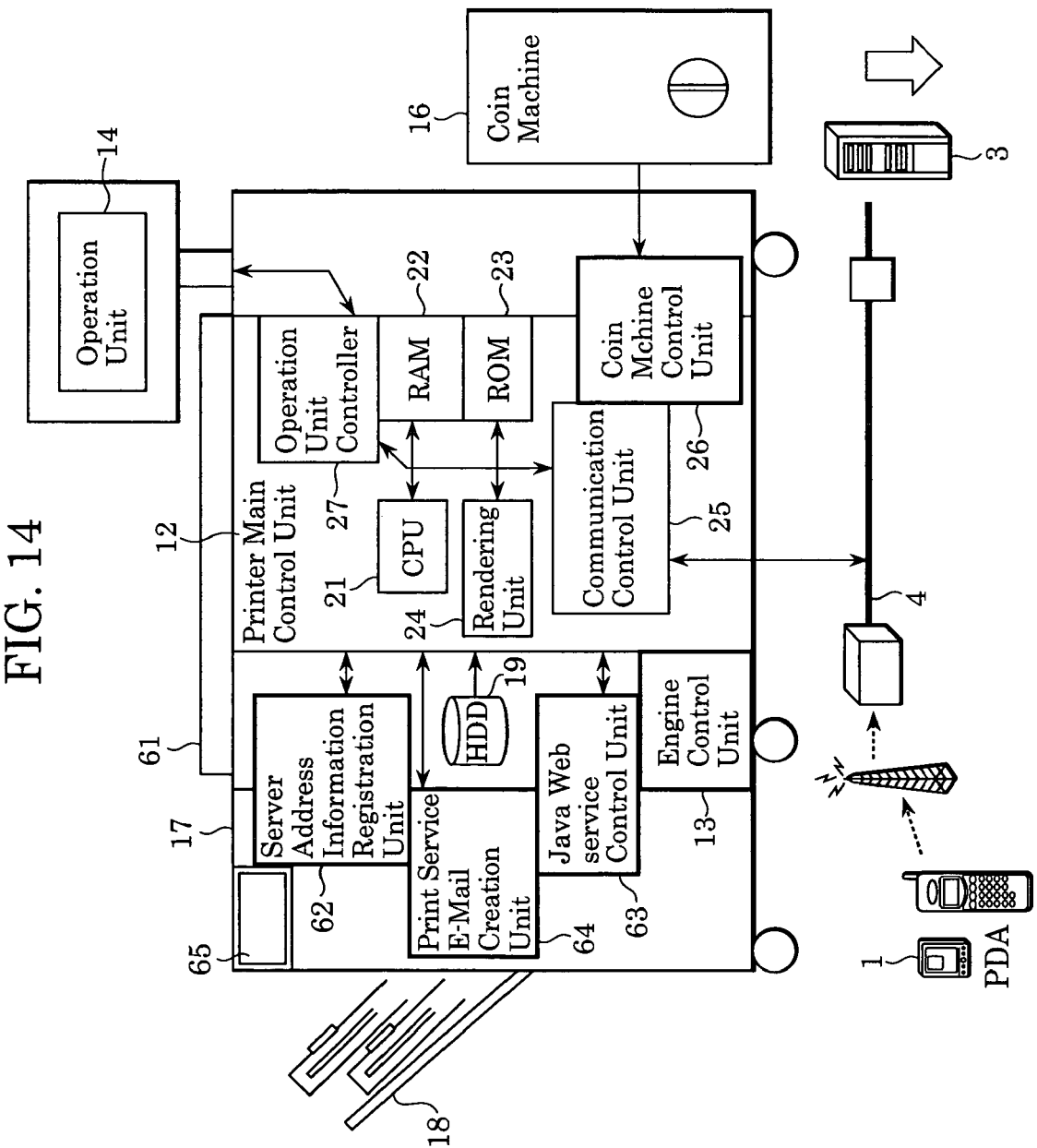
FIG. 14 is a block diagram of a public printer according to the third embodiment.

When the user inserts coins for the displayed fee into the coin machine 16 shown in FIG. 14, the public printer 60 executes printing. As a result, the user can acquire a desired printout. The public printer 60 then displays the completion of printing, as shown by a display screen 1905.

As described above, although a user does not know the access address of the server in advance, the user can receive the address information of the server by sending a print request to the Web using a mobile information device 1. Accordingly, the user can send a print instruction to a public printer from the mobile information device 1 via the server 3.

That is, a public printer 60 has a function that allows a user to access a Web page in the public printer via a mobile information device 1 in order to specify a print mode and a password used for a print service. The public printer further has a function in which it sends, to the mobile information device, an e-mail including address information on the public printer, the specified print mode, and the specified password in the subject section and including an address of a print-service server for printing on the public printer 60 as a reply address. When the user attaches a print file to the e-mail for transmitting the print file and replies to the e-mail, the print file server has a function that identifies the address and the type of the public printer used for printing and the print mode from the subject information in the e-mail for transmitting the print file. Accordingly, a user can print a print file in a mobile information device 1 using a public printer 60 located in a public place without uploading the print file to a print-service server 3 in advance and without contracting or enrolling in the print service. In addition, by using a Web service in individual public printers, the user can freely set and use a variety of the product-dependent print modes. As a result, high quality image printing and high performance printing can be provided.

Furthermore, since each printer notifies a user of a print-service server, a global print service that can expand worldwide can be provided. Still furthermore, unlike the first embodiment, this embodiment can be achieved even though the mobile information device 1 has no short range communication means. That is, this embodiment has an advantage in that the print service can be provided under the current infrastructure and in that, once a user utilizes the service, the user can send a print file from remote locations without getting close to the public printer 60.

A method for realizing the process in the first embodiment by a computer in the public printer 2 executing a program is described next with reference to FIG. 2.

A control procedure (computer program) of the CPU 21 is stored in the ROM 23 in advance. The process starts when the CPU 21 executes the computer program. The computer program is stored in the HDD 19. The computer program is copied to the RAM 22 and is then executed. The RAM 22 is used as a work memory for inputting, outputting, transmitting, and receiving data. The RAM 22 is also used as a temporary memory used for controlling each component of the apparatus. The CPU 21 carries out the process of the first embodiment by executing the computer program in the RAM 22.

Like the first embodiment, the second and third embodiments can be achieved by the computer of the public printer executing a program. Additionally, the mobile information device 1 and the print-service server 3 that have the same configuration as a computer unit of the public printer 2 can realize the processes in the first to third embodiments by executing a program.

As described above, the first to third embodiments can be realized by a computer executing a program. Additionally, a medium for supplying the program to the computer, for example, a computer-readable recording medium, such as a CD-ROM (compact disk-ROM), or a communication medium for transferring the program, such as the Internet, may be applied as an embodiment of the present invention. Furthermore, a computer program product, such as a computer-readable recording medium recording the above-described program, may be applied as an embodiment of the present invention. The recording medium includes, for example, a flexible disk, a hard disk, an optical disk, a magneto optical disk, a CD-ROM, a magnetic tape, a nonvolatile memory card, and a ROM.

As described above, according to the first to third embodiments of the present invention, upon reception of a print request from a mobile information device, a public printer sends address information on a server to the mobile information device. Upon reception of print data from the mobile information device via the server, the public printer executes printing.

Accordingly, without uploading the print file in a mobile information device 1 to a print-service server 3 in advance and without contracting or enrolling in the print service, a user can receive address information of the print-service server 3 and can print the print file using a public printer located in a public place. In addition, by specifying the product-dependent print driver, high quality image printing and high performance printing can be advantageously provided compared to using a common printer driver.

A public printer (printing apparatus) has functionality for pre-storing identification information on print job reception of a print-service server supporting a print service for the public printer, for sending the identification information on print job reception to a mobile information device of a user who requests the print service, and for asking for password input via an operation unit before print execution and stopping the print execution if the password is not input in a predetermined time period.

A print-service server can receive a print file, a print mode, a password, the address of the printing apparatus, and identification information of a printer driver for the printing apparatus from the mobile information device 1 based on the information on the print job received. The print-service server 3 creates a print command file from the print file using the identified printer driver for the printing apparatus. The print-service server then transmits the print command file to the printing apparatus via the Internet.

That is, the printing apparatus, by itself, notifies a user of identification information of a print server 3 which supports a print service on the printing apparatus and identification information on a print driver. The user transfers a desired print file in a mobile information device 1 to the server 3 based on the identification information on the server 3 and printer driver. Thus, the user can execute printing of the desired print file without troublesome selection of a print-service server and printer.

Furthermore, as an optional function, the printing apparatus provides a Web service that allows access from the mobile information device 1 via the Internet. When a user inputs a variety of print modes and a password required for starting print execution via the Web service, the printing apparatus creates an e-mail which is to be sent to a print-service server 3 and which includes a print mode and the password. The e-mail is then sent to the mobile information device 1 of the user.

Thus, a finishing function that is specific to the used public printer and a user interface that allows easy setting of a high quality printing function from the mobile information device 1 can be provided. Also, the user can easily select a print-service server and a print driver via the mobile information device 1. Accordingly, complicated print mode settings and corresponding printing that known methods cannot provide can be provided simply by operating the mobile information device 1.

The e-mail sent from the printing apparatus contains the print mode setting information, the password, and the driver identification and address information of the printing apparatus in the subject section or the mail body section. Also, the reply address section of the e-mail contains the server address. When the user attaches a print file to the e-mail and replies to the e-mail, the e-mail containing the print file, the print mode information, the password information, the printing apparatus driver identification information, and the printing apparatus address information is automatically sent to the server.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-170226 filed Jun. 8, 2004, which is hereby incorporated by reference herein.

What is claimed is:

1. A printing apparatus comprising:
a receiving unit adapted to receive a print request from a mobile information device;
a notifying unit adapted to, upon receiving the print request from the mobile information device, notify a URL of a print-data registration site which is used by the mobile information device for registering print data, wherein the URL includes an address of a server which provides the print-data registration site and identification information of the printing apparatus;
a print data receiving unit adapted to receive print data which is registered in the server by the mobile information device by accessing the server using the URL, wherein the print data is transmitted from the server based on the identification information of the printing apparatus included in the URL; and
a printing unit adapted to print the print data received by the print data receiving unit.

2. The printing apparatus according to claim 1, wherein the receiving unit and the notifying unit carry out receiving and notifying processes via short range wireless communication.

3. The printing apparatus according to claim 1, wherein the receiving unit and the notifying unit carry out receiving and notifying processes via e-mail.

4. The printing apparatus according to claim 1, wherein the notifying unit notifies the URL as a reply address via e-mail.

5. The printing apparatus according to claim 1, wherein the printing unit executes a print process in response to a user input of a password that matches a password received from the mobile information device via the server.

6. The printing apparatus according to claim 1,
wherein the print-data registration site is a web site, and
wherein the address information is a URL of the print-data registration site.

7. The printing apparatus according to claim 1,
wherein the server specifies a printer driver dedicated to the printing apparatus, based on the identification information of the printing apparatus, and
wherein the server generates the print data by using the specified printer driver.

8. The printing apparatus according to claim 1, wherein server transmits the print data edited in the server.

9. A method for a printing apparatus to perform printing, the method comprising:
   a receiving step for receiving a print request from a mobile information device;
   a notifying step for, upon receiving the print request from the mobile information device, notifying a URL of a print-data registration site which is used by the mobile information device for registering print data, wherein the URL includes an address of a server which provides the print-data registration site and identification information of the printing apparatus;
   a print data receiving step for receiving print data which is registered in the server by the mobile information device by accessing the server using the URL, wherein the print data is transmitted from the server based on the identification information of the printing apparatus included in the URL; and
   a printing step for printing the print data received in the print data receiving step.

10. The method for printing according to claim 9, wherein the receiving step and the notifying step carry out receiving and notifying processes via short range wireless communication.

11. The method for printing according to claim 9, wherein the receiving step and the notifying step carry out receiving and notifying processes via e-mail.

12. The method for printing according to claim 9, wherein the notifying step notifies an e-mail including the address of the server as a reply address.

13. The method for printing according to claim 9, wherein the printing step executes a print process in response to a user input of a password that matches a password received from the mobile information device via the server.

14. A printing system for printing based on a print request sent from a mobile information device, the printing system comprising:
   a printing apparatus; and
   a server;
   wherein the printing apparatus comprises:
      a first receiving unit adapted to receive the print request from the mobile information device;
      a notifying unit adapted to, upon receiving the print request, notify a URL of a print-data registration site which is used by the mobile information device for registering print data, wherein the URL includes an address of the server which provides the print-data registration site and identification information of the printing apparatus;
      a print data receiving unit adapted to receive print data which is registered in the server by the mobile information device by accessing the server using the URL, wherein the print data is transmitted from the server based on the identification information of the printing apparatus included in the URL; and
   a printing unit adapted to print the print data received by the print data receiving unit;
   and wherein the server comprises:
      a second receiving unit adapted to receive print data from the mobile information device; and
      a transmitting unit adapted to transmit, to the printing apparatus, created print data created based on the print data received from the mobile information device.

15. The printing system according to claim 14, wherein the first notifying unit transmits identification information of the printing apparatus to the server via the mobile information device, and the transmitting unit transmits, to the printing apparatus, print data converted by a print driver for the printing apparatus in accordance with the identification information of the printing apparatus.

* * * * *